J. M. PETERSON.
Device for Cutting Railroad-Rails.

No. 217,400.    Patented July 8, 1879.

WITNESSES:
Achilles Schehl.
C. Sedgwick

INVENTOR:
J. M. Peterson
BY Munn & Co.
ATTORNEYS.

UNITED STATES PATENT OFFICE.

JOHN M. PETERSON, OF MICHIGAMME, MICHIGAN.

IMPROVEMENT IN DEVICES FOR CUTTING RAILROAD-RAILS.

Specification forming part of Letters Patent No. 217,400, dated July 8, 1879; application filed November 26, 1878.

*To all whom it may concern:*

Be it known that I, JOHN M. PETERSON, of Michigamme, in the county of Marquette and State of Michigan, have invented a new and Improved Device for Cutting Railroad-Rails, of which the following is a specification.

The object of this invention is to provide a device for cutting out defective parts of railroad-rails without removing the rails from the track.

The invention consists of two arms, pivoted together at one end and the opposite free ends adapted to receive cutters, which are applied to opposite sides of the rail and forced against the same by a ratchet-lever screwing a nut upon a shaft joining the ends of the arms, whereby the knives or cutters are caused to cut through the rail from side to side.

Figure 1:
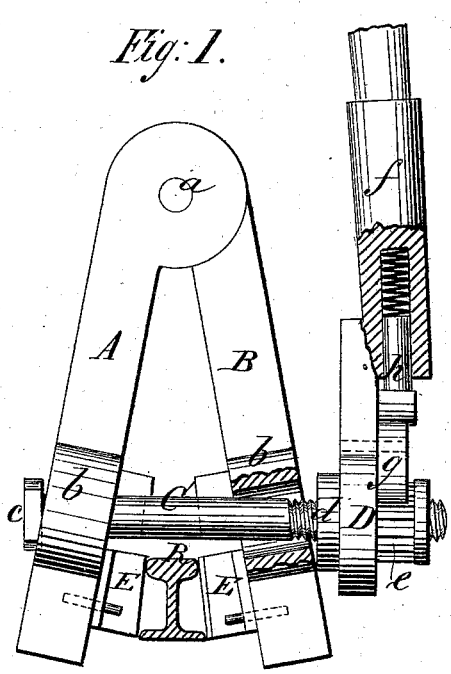
Figure 2:
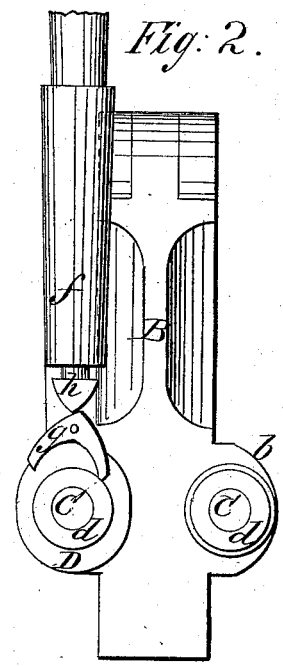
Figure 3:
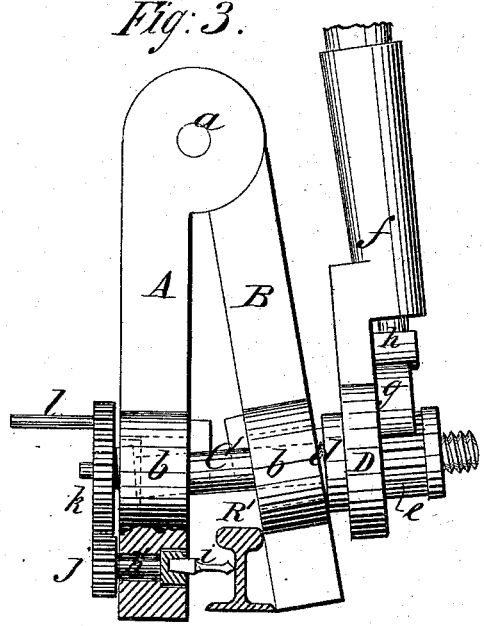
Figure 4:
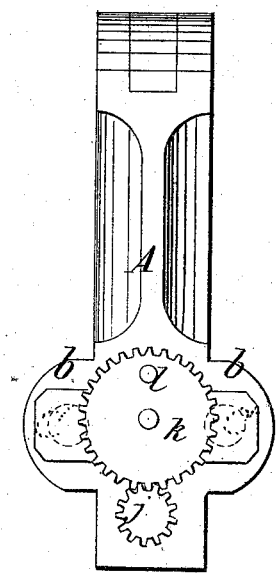
Figure 5:
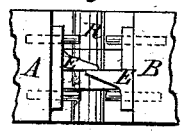

In the accompanying drawings, forming part of this specification, Figure 1 is a view of my improved device for cutting railroad-rails. Fig. 2 is an end view of the same, showing the operating mechanism. Fig. 3 represents the arms of the device provided with an attachment for drilling the rails. Fig. 4 is an end view of the drill-operating mechanism. Fig. 5 is a top view of the knives in place.

Similar letters of reference indicate corresponding parts.

Referring to the drawings, A B are two arms, pivoted at $a$. On these arms, on each side, are bosses $b$, with holes, in which bosses are placed horizontal shafts C, each having on one end a head, $c$, and on the opposite end a screw-thread, engaging a nut, $d$, which bears against the side of arm B. A projection, $e$, of the nut is ratcheted.

D represents a collar connected with a stock or handle, $f$, which is placed over the nut. On this collar is pivoted the double pawl $g$, kept in place to give reverse motion to the nut by the spring-guard $h$, socketed in the handle $f$.

Below shafts C is fixed to the inside of each arm a knife, E, one opposite the other, but the faces arranged so that they will pass each other like the blades of shears, as clearly shown in Fig. 5.

The operation of my invention is as follows: The arms A B are placed one on each side of the rail R to be cut, with the knives in contact therewith, as shown in Fig. 1.

By means of the ratchet and pawl the nut $d$ is screwed up against arm B, thus drawing the two arms toward each other by their shaft-connections, and forcing the knives into the rail.

The ratchet is applied to the two nuts alternately and at short intervals, so as to keep the two sides even, and the operation is kept up until the rail is cut through.

In Figs. 3 and 4 I have shown an attachment applied to the arms by means of which the machine may be adapted to the drilling of holes, the knives being, of course, removed when the drilling mechanism is attached.

In the end of arm A is placed a shaft, $h'$, the inner end of which is enlarged and provided with a socket to receive the butt of the drill $i$, while the outer end is fixed to the pinion $j$, which gears with the spur-wheel $k$, journaled on a stud projecting from the arm A and operated by a crank, $l$. By means of this crank and gearing the drill is turned.

To operate it to drill the holes in the rails, the arms are put over the rail R', with the drill in contact with the web at the proper place. By means of the ratchet and nut the arms are brought together, so that the rail will be clasped between the end of the drill and the opposite arm, as shown in Fig. 3. The work of drilling the hole then proceeds, and as the drill cuts its way into the rail it is fed up to its work by screwing up the arms, and this is continued until the rail is perforated.

Either the cutter or drill may be applied while the rails are on the track, there being no necessity for raising them out of their places, and thus it will be seen a very convenient and effective device is furnished that can be used at any time and by one man, thus obviating the necessity of taking up and replacing rails for the purpose of cutting and drilling them.

Having thus described my invention, I claim as new and desire to secure by Letters Patent—

As an improvement in devices for cutting railroad-rails, the arms A B, pivoted together and connected by horizontal shafts C, nuts $d$, operated by pawl $g$, engaging ratchet $e$, in combination with the knives E, fixed to the arms, whereby the screwing up of the nuts by the ratchet and pawl brings the arms together, and causes the knives to cut the rail when applied thereto, substantially as described.

JOHN M. PETERSON.

Witnesses:
AUGUST C. COOK,
CARL J. HANSON.